(12) United States Patent
Hawkins et al.

(10) Patent No.: US 10,616,193 B2
(45) Date of Patent: Apr. 7, 2020

(54) PROCESSING RESOURCE REQUESTS ON A MOBILE DEVICE

(71) Applicant: BlackBerry Limited, Waterloo (CA)

(72) Inventors: Siavash James Joorabchian Hawkins, London (GB); Ian Harvey, Cambridgeshire (GB); Mark Wooding, Cambridgeshire (GB)

(73) Assignee: BlackBerry Limited, Waterloo, Ontario (CA)

( * ) Notice: Subject to any disclaimer, the term of this patent is extended or adjusted under 35 U.S.C. 154(b) by 165 days.

(21) Appl. No.: 15/666,068

(22) Filed: Aug. 1, 2017

(65) Prior Publication Data

US 2019/0044925 A1 Feb. 7, 2019

(51) Int. Cl.
| | | |
|---|---|---|
| *H04L 29/06* | (2006.01) | |
| *H04L 29/08* | (2006.01) | |
| *H04W 12/02* | (2009.01) | |
| *G06F 21/60* | (2013.01) | |
| *H04L 9/00* | (2006.01) | |

(52) U.S. Cl.
CPC ........ *H04L 63/0471* (2013.01); *G06F 21/602* (2013.01); *H04L 63/0281* (2013.01); *H04L 67/02* (2013.01); *H04L 67/2842* (2013.01); *H04W 12/02* (2013.01); *G06F 2221/2107* (2013.01); *G06F 2221/2115* (2013.01); *H04L 9/00* (2013.01); *H04L 63/0428* (2013.01)

(58) Field of Classification Search
CPC .................................................... H04L 63/471
USPC .......................................................... 713/153
See application file for complete search history.

(56) References Cited

U.S. PATENT DOCUMENTS

| | | | | |
|---|---|---|---|---|
| 2009/0129587 | A1* | 5/2009 | Zhou | H04N 7/1675 380/42 |
| 2014/0331297 | A1 | 11/2014 | Innes et al. | |
| 2016/0197909 | A1* | 7/2016 | Innes | H04L 63/0807 726/6 |
| 2016/0234209 | A1 | 8/2016 | Kahol et al. | |

FOREIGN PATENT DOCUMENTS

WO 2016111968 7/2016

OTHER PUBLICATIONS

Extended European Search Report issued in European Application No. 18186893.6 dated Nov. 6, 2018, 9 pages.
Communication Pursuant to article 94(3) EPC issued in European Application No. 18186893.6 dated Oct. 1, 2019, 8 pages.

* cited by examiner

*Primary Examiner* — Jacob Lipman
(74) *Attorney, Agent, or Firm* — Fish & Richardson P.C.

(57) ABSTRACT

Systems, methods, and software can be used to process a resource request. In some aspects, a method, comprising: transmitting, from a mobile device, an encrypted request to a proxy server, wherein the encrypted request comprises a Hypertext Transfer Protocol (HTTP) request, the HTTP request is addressed to an application server that provides service to an application on the mobile device, and the encrypted request is encrypted using an application-specific credential that is associated with the application; and receiving, at the mobile device, an encrypted response in response to the encrypted request, wherein the encrypted response comprises an HTTP response generated by the application server.

20 Claims, 4 Drawing Sheets

PROCESSING RESOURCE REQUESTS ON A MOBILE DEVICE

TECHNICAL FIELD

The present disclosure relates to processing resource requests on a mobile device

BACKGROUND

In some cases, applications executing on a mobile device may request resources from an application server to complete an operation. In one example, an email application may request updated email information from an email server to complete a synchronization application. In another example, a file transfer application may request a file from a remote file system to complete a file transfer protocol (FTP) operation. In some cases, the resource request and resource responses can be formated according to the Hypertext Transfer Protocol (HTTP) format.

DESCRIPTION OF DRAWINGS

Like reference numbers and designations in the various drawings indicate like elements.

DETAILED DESCRIPTION

Figure 1:
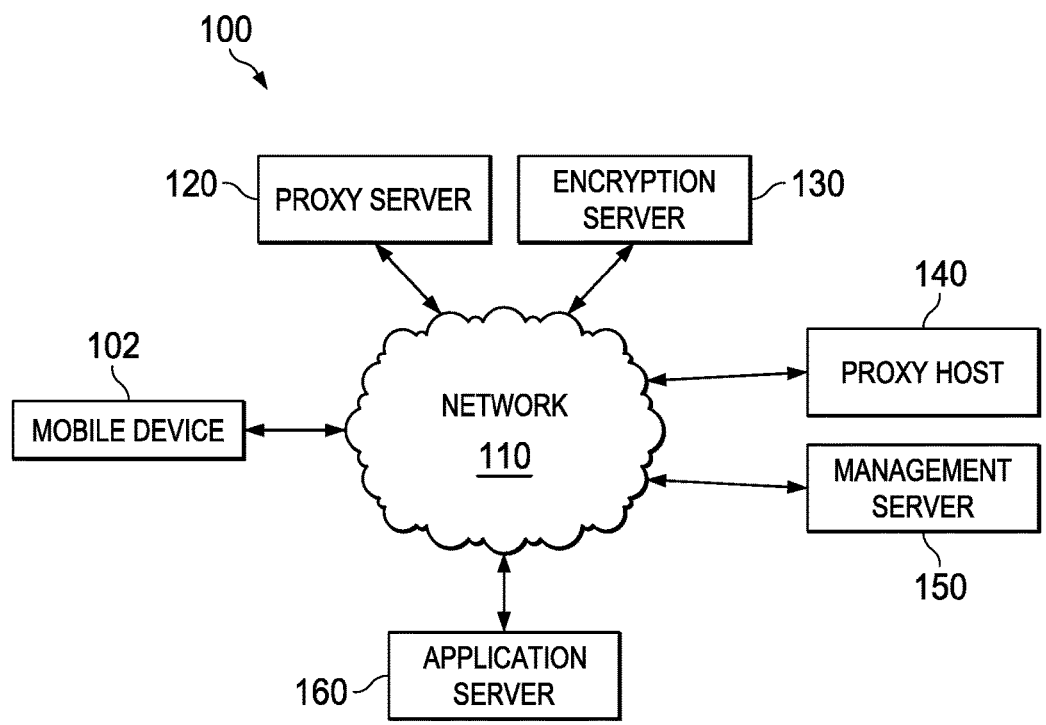
FIG. 1 is a schematic diagram showing an example communication system that processes resource requests, according to an implementation.

In some cases, the application can generate the resource requests and send the resource requests to the application server that provides the services. In some implementations, a system process on the mobile device may be used to manage the transmission and reception of the external messages. For example, a system process implemented on the mobile device can manage the HTTP requests and responses on behalf of applications that are executing on the mobile device. In some cases, while the application is executing on the foreground, the application can manage the external messages such as HTTP requests and responses. While the application is executing on the background, the application can use the system process to manage the transmission and receptions of these external messages. The application can be suspended while the request and response are being managed by the system process. The system process can schedule the data communication of the HTTP requests and response of the application that the system process manages. The system process can manage the HTTP requests and responses from different applications, some or all of which can be suspended when the HTTP requests or responses are pending. The system process can cause the application to resume when the HTTP response is ready. The system process can cause each application to resume processing at different times. Other examples of external messages handled by the system process include FTP messages. This approach increases the efficiency of background processes of multiple applications. In some implementations, the system process can be implemented as part of the operating system on the mobile device.

Because the system process handles the background messages for multiple applications and may not have a strong security protection, there may be security risks for these resource requests and resource responses that are sent to the system process. The concerns for security risks may be higher for enterprise applications that may include sensitive information in the resource requests and resource responses. Moreover, the target address of the resource requests, e.g., the application server that provides the service, may be exposed in the resource requests and may be used by potential malicious attacks.

In some cases, the application on the mobile device can establish application-specific encryption credentials and a transmission path identifier with a management server. The encryption credentials can be used to encrypt resource requests before sending to the system process to handle. Furthermore, the transmission path identifier can be used for a proxy server to send the encryted resource request to the encrytion server. The encrytion server can decrypt the encrypted resource request and forward the decryted resource request to the application server. Similarly, the resource response can also be encrypted by the encryption server and sent to the system process through the proxy server. FIGS. 1-5 and associated descriptions provide additional details of these implementations. These approaches provide a secure implementation for transmitting, receiving, and processing resource requests and responses. The contents of the resource requests and responses are encrypted and the system process or other applications cannot access these contents without the application-specific encryption credentials. Furthermore, the address of the application server is masked by using a proxy server and also cannot be accessed by the system process or other applications on the mobile device.

FIG. 1 is a schematic diagram showing an example communication system 100 that processes resource requests, according to an implementation. At a high level, the example communication system 100 includes a mobile device 102 that is communicatively coupled a management server 150 over a network 110. The communication system 100 also includes a proxy server 120, an encryption server 130, a proxy host 140, and an application server 160 that are communicatively coupled with the network 110.

The application server 160 represents an application, a set of applications, software, software modules, hardware, or any combination thereof that can be configured to provide resources for an application executed on the mobile device 102. In some cases, the application can be an enterprise application, e.g., email, messaging, file sharing, or other enterprise applications. The resources provided by the application server 160 can include enterprise resources, e.g., file systems, websites, portals. Alternatively, the application server 160 can provide resource for a personal application executing on the mobile device 102. In some cases, access to the resources can be granted to users that are authenticated. In some cases, the application server 160 can receive resource requests, e.g., HTTP requests, and respond with resource responses, e.g., HTTP responses. FIGS. 2-5 and associated descriptions provide additional details of these implementations.

The management server 150 represents an application, a set of applications, software, software modules, hardware, or any combination thereof that can be configured to manage applications and devices for the mobile device 102. In one example, the management server 150 can be implemented as part of an enterprise mobility management (EMM) server. The EMM server can install, update, and manage the license of enterprise applications. In some cases, the management server 150 can be located on the premise of the enterprise, behind a firewall, or a combination thereof. In some cases, the management server 150 can be configured to provision an enterprise service in a cloud. In some implementations, the management server 150 can establish encryption credentials and a transmission path with the mobile device 102 for transmitting resource requests. FIGS. 2-5 and associated descriptions provide additional details of these implementations.

The encryption server 130 represents an application, a set of applications, software, software modules, hardware, or any combination thereof, that decrypts resource requests and forwards the decrypted resource requests to the application server 160. The encryption server 130 can also encrypt resource responses received from the application server 160 and forwards the encrypted resource responses to the proxy server 120. In some cases, the encryption server 130 can be located on the premise of the enterprise, behind a firewall, or a combination thereof. In some cases, the encryption server 130 can be implemented on the same platform as the management server 150. Alternatively or additionally, the encryption server 130 can be implemented in a cloud computing platform. FIGS. 2-5 and associated descriptions provide additional details of these implementations.

The proxy server 120 represents an application, a set of applications, software, software modules, hardware, or any combination thereof that can be configured to provide a proxy service. In some cases, the proxy server 120 can be provisioned to forward the resource requests received from the mobile device 102 to the encryption server 130 and forward the resource response received from the encryption server 130 to the mobile device 102. In some cases, the proxy server 120 also authenticates the mobile device 102 and the encryption server 130 before forwarding the resource requests and the resource responses. FIGS. 2-5 and associated descriptions provide additional details of these implementations.

The proxy host 140 represents an application, a set of applications, software, software modules, hardware, or any combination thereof that can be configured to provision the proxy server 120. In some cases, the management server 150 can send a proxy request to the proxy host 140 and the proxy host 140 can provision the proxy server 120 according to the proxy request and return a proxy response to the management server 150. In some cases, the proxy host 140 can be implemented as part of a network operation center (NOC) associated with an enterprise or an enterprise service.

The example communication system 100 includes the network 110. The network 110 represents an application, set of applications, software, software modules, hardware, or combination thereof that can be configured to transmit data messages between the entities in the system 100. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

In operation, the mobile device 102 can establish application-specific encryption credentials and a transmission path identifier with the management server 150. The encryption credentials can be used to encrypt resource requests sent from the mobile device 102. The proxy server 120 is provisioned to forward the encrypted resource requests to the encryption server 130 based on a mapping relationship indicated by the transmission path identifier. The encryption server 130 decrypts the resource requests and forwards the decrypted resource requests to the application server 160. In the reverse direction, the application server 160 sends the resource responses to the encryption server 130. The encryption server 130 encrypts the resource responses using the encryption credentials and sends the encrypted resource responses to the proxy server 120, which forwards the encrypted resource responses to the mobile device 102. FIGS. 2-5 and associated descriptions provide additional details of these implementations.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
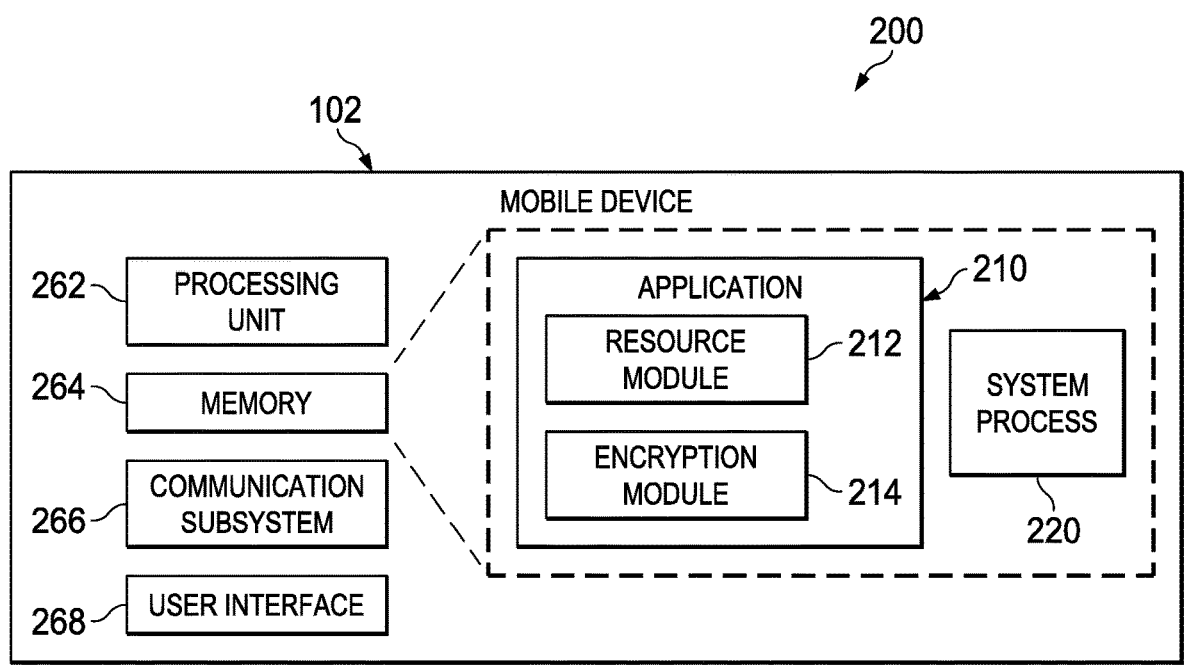
FIG. 2 is a schematic diagram showing an example mobile device that generates a resource request, according to an implementation.

FIG. 2 is a schematic diagram 200 showing an example mobile device 102 that generates a resource request, according to an implementation. The mobile device 102 includes a processing unit 262, a communication subsystem 266, a user interface 268, and memory 264. A mobile device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

Figure 4:
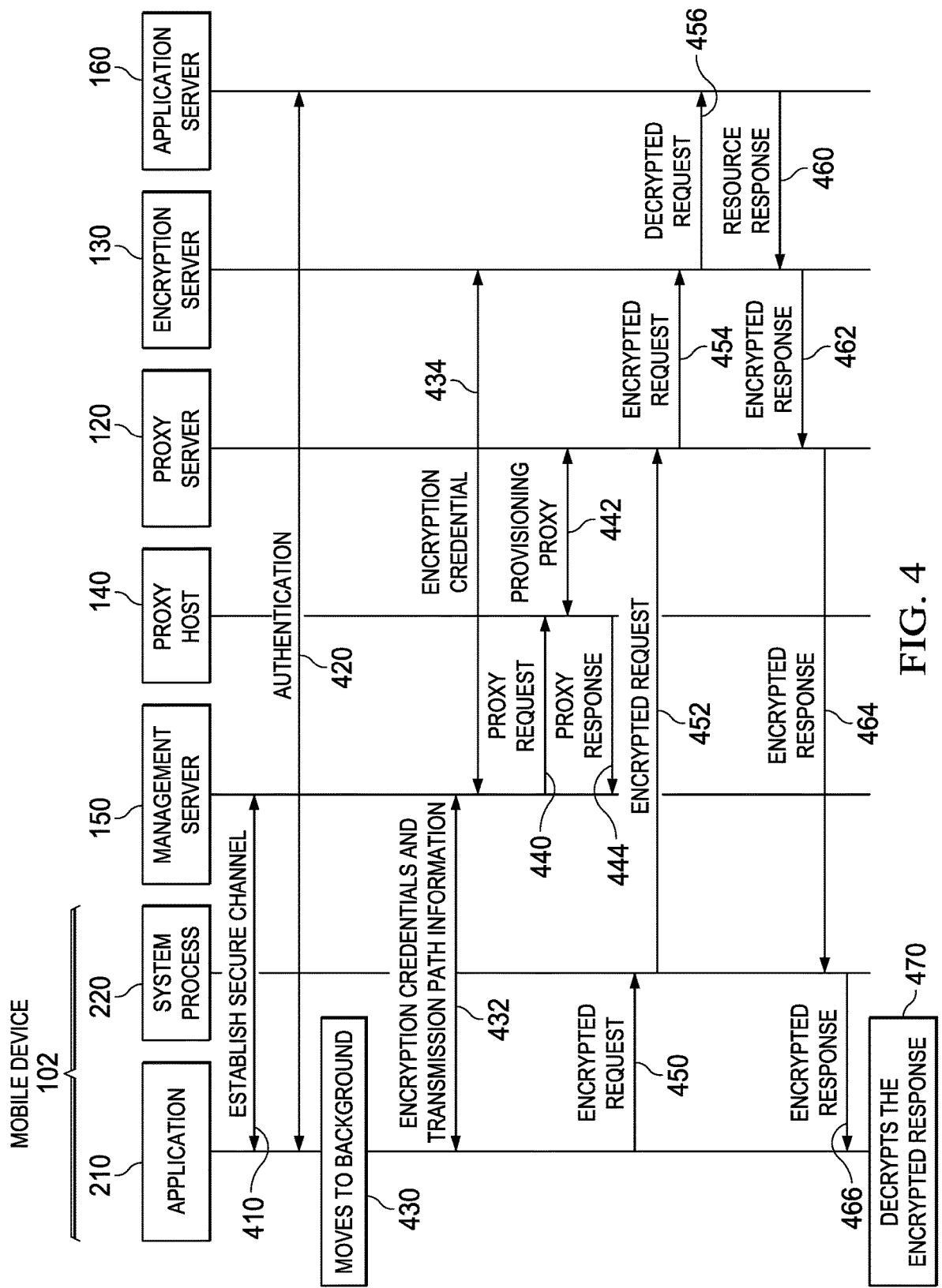
FIG. 4 is a flow diagram showing an example process for processing a resource request, according to an implementation.

The example user interface 268 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. In some cases, the user interface 268 can be used to receive user input for authenticaiton credentials. FIG. 4 and associated descriptions provide additional details of these implementations. The user interface 268 can also include I/O interface, for example, a universal serial bus (USB) interface.

The example memory 264 can be a computer-readable storage medium on the mobile device 102. Examples of the memory 264 include volatile and non-volatile memory, magnetic media, optical media, random access memory (RAM), read-only memory (ROM), removable media, and others. The memory 264 can store an operating system (OS) of the mobile device 102 and various other computer-executable software programs for performing one or more of the processes, steps, or actions described above.

The memory 264 can store applications, data, operation system, and extensions for the mobile device 102. As illustrated, the memory 264 stores an application 210 and a system process 220.

Applications, e.g., the application 210, can include programs, modules, scripts, processes, or other objects that can execute, change, delete, generate, or process application data. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, ANDROID, iOS, or Microsoft's .NET. Further, while illustrated as internal to the mobile device 102, one or more processes associated with an application may be stored, referenced, or executed remotely. For example, a portion of an application may be an interface to a web service that is remotely executed. Moreover, an application may be a child or sub-module of another software module (not illustrated).

The application 210 includes a resource module 212 and an encryption module 214. The resource module 212 includes programs, modules, scripts, processes, or other objects that can be configured to generate resource requests and process resource responses. In some cases, the resource requests and resource responses can be HTTP requests and HTTP responses, respectively. The resource requests are addressed to an application server, e.g., the application server 160 shown in FIG. 1, to request resources. The resource responses can be generated from the application server 160 in response to the resource requests.

In one example, the application 210 can be an email application. The email application can execute resource access operations, e.g., synchronization operations, in the background. The email application can generate HTTP requests for synchronization updates. The HTTP requests can be processed by an email server. In response, the email server can send HTTP responses that include the latest received emails to the email application. In other examples, the application 210 can be a file transfer application that generates FTP messages.

Figure 5:
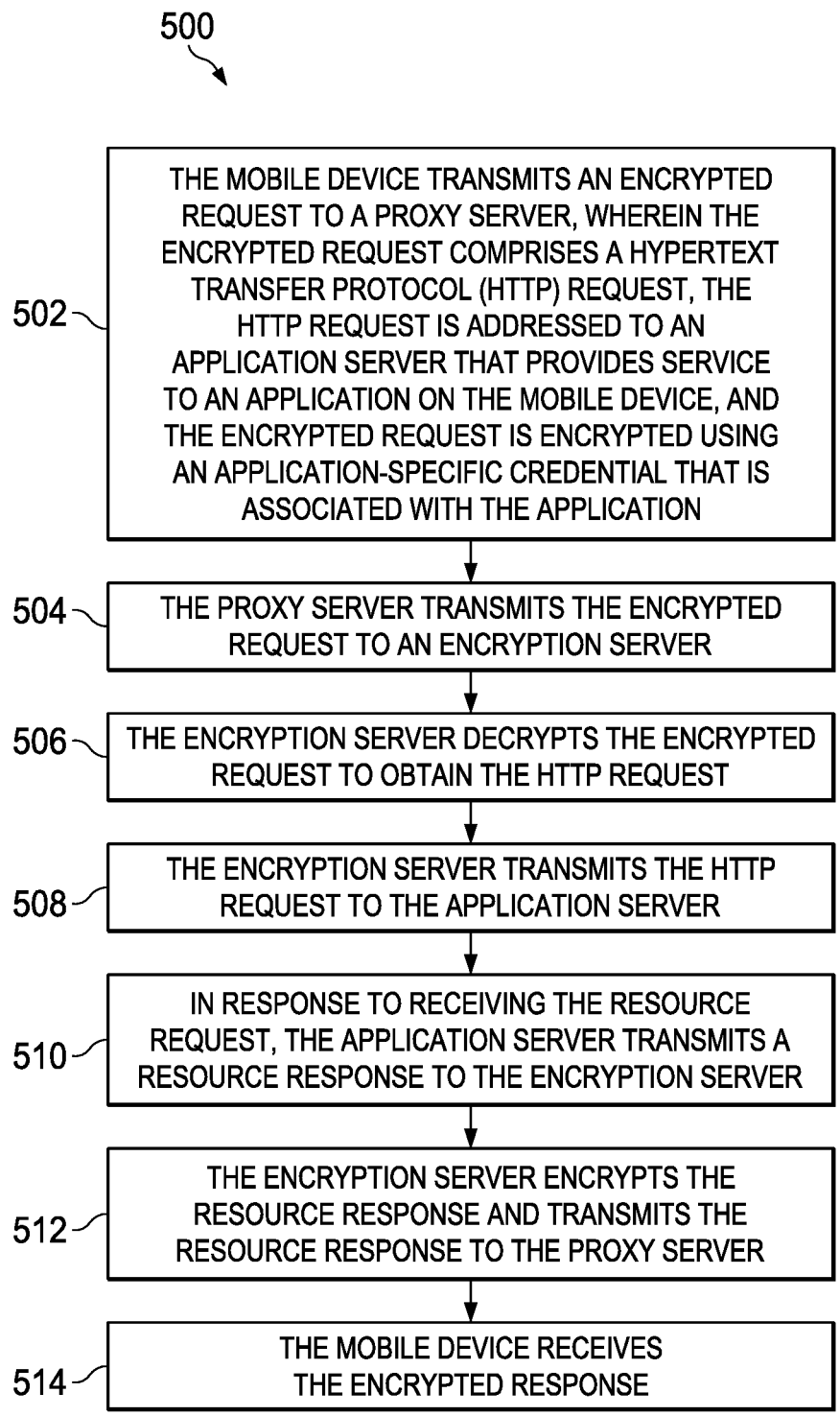
FIG. 5 is a flow diagram showing an example method for processing a resource request, according to an implementation.

The encryption module 214 includes programs, modules, scripts, processes, or other objects that can be configured to encrypt the resource requests before forwarding the encrypted resource requests to the system process 220, and decrypt the encrypted resource responses received from the system process 220 before forwarding to the resource module 212 for further processing. In some cases, the encryption module 214 can establish one or more encryption credentials with a management server, e.g., the management server 150 shown in FIG. 1, and use the one or more encryption credentials for encrypting and decrypting operations. In some cases, the encryption module 214 can also establish a transmission path identifier with the management server. The transmission path identifier can be used by the proxy server to forward the encrypted request to the encryption server. FIGS. 4-5 and associated descriptions provide additional details of these implementations.

The system process 220 includes programs, modules, scripts, processes, or other objects that can be configured to transmits external requests, e.g., HTTP requests, and receives external responses, e.g., HTTP responses for applications executing in background on the mobile device 102. In some cases, the system process 220 can be part of an operating system of the mobile device 102. In one example, the system process 220 can be a Uniform Resource Locator (URL) session.

Turning to a general description, a mobile device, e.g., the mobile device 102, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

While elements of FIG. 2 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 3:
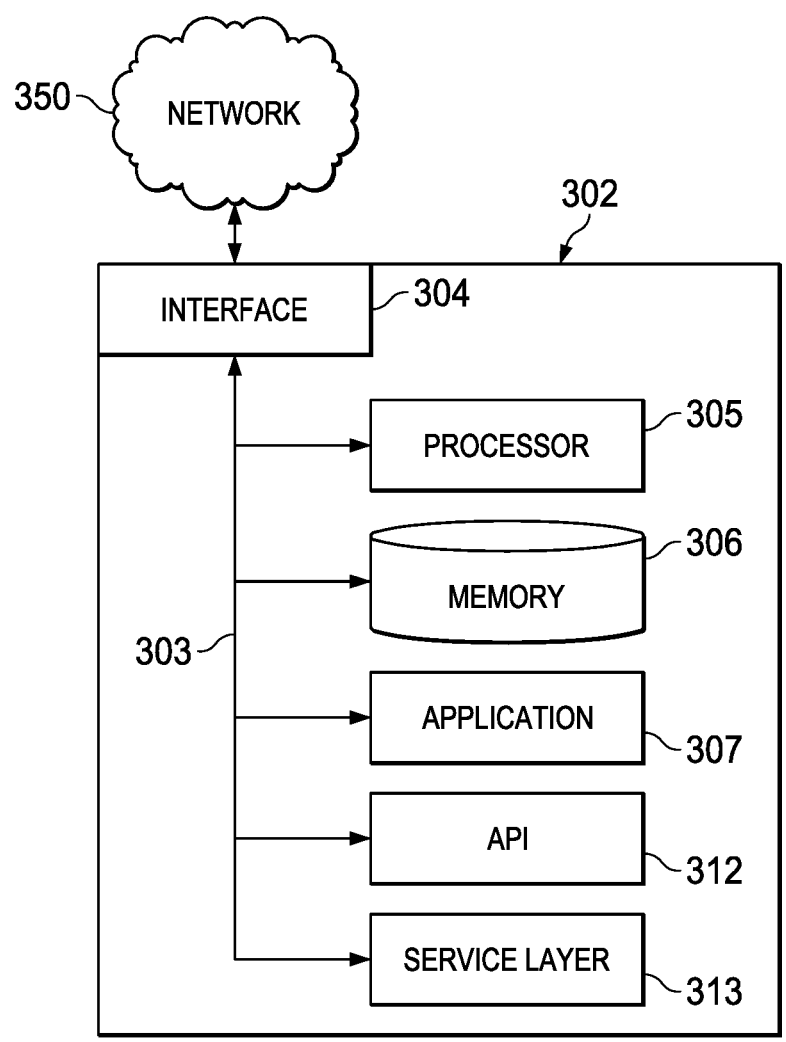
FIG. 3 is a high-level architecture block diagram showing a server coupled with a network, according to an implementation.

FIG. 3 is a high-level architecture block diagram showing a server 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the server 302 and other devices. The network 350 can be a wireless or a wireline network, a memory pipe, a hardware connection, or any internal or external communication paths between the components.

The server 302 includes a computing system configured to perform the algorithm described in this disclosure to process resource request. For example, the server 302 can be used to implement the proxy server 120, the encryption server 130, the proxy host 140, the management server 150, the application server 160, or any combinations thereof shown in FIG. 1. In some cases, the algorithm can be implemented in an executable computing code, e.g., C/C++ executable codes. Alternatively, or in combination, the algorithm can be implemented in an application program, e.g., EXCEL. In some cases, the server 302 can include a standalone Linux system that runs batch applications. In some cases, the server 302 can include mobile or personal computers that run the application program.

The server 302 may include an input device, such as a keypad, keyboard, touch screen, microphone, speech recognition device, or another device that can accept user information, and/or an output device that conveys information associated with the operation of the server 302, including digital data, visual and/or audio information, or a GUI.

The server 302 can serve as a client, network component, a server, a database or other persistency, or the like. In some implementations, one or more components of the server 302 may be configured to operate within a cloud-computing-based environment.

At a high level, the server 302 is an electronic computing device operable to receive, transmit, process, store, or manage data and information. According to some implementations, the server 302 may also include or be communicably coupled with an application server, e-mail server, web server, caching server, streaming data server, business intelligence (BI) server, and/or other server.

The server 302 can receive requests over network 350 from a client application (e.g., executing on a user device) and respond to the received requests by processing the said requests in an appropriate software application. In addition, requests may also be sent to the server 302 from internal users (e.g., from a command console or by another appropriate access method), external or third parties, other automated applications, as well as any other appropriate entities, individuals, systems, or computers.

Each of the components of the server 302 can communicate using a system bus 303. In some implementations, any and/or all the components of the server 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the server 302. The functionality of the server 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the server 302, alternative implementations may illustrate the API 312 and/or the service layer 313 as stand-alone components in relation to other components of the server 302. Moreover, any or all parts of the API 312 and/or the service layer 313 may be implemented as child or sub-modules of another software module, enterprise application, or hardware module, without departing from the scope of this disclosure.

The server 302 includes an interface 304. Although illustrated as a single interface 304 in FIG. 3, two or more interfaces 304 may be used according to particular needs, desires, or particular implementations of the server 302. The interface 304 is used by the server 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware is operable to communicate physical signals.

The server 302 includes a processor 305. Although illustrated as a single processor 305 in FIG. 3, two or more processors may be used according to particular needs, desires, or particular implementations of the server 302. Generally, the processor 305 executes instructions and manipulates data to perform the operations of the server 302. Specifically, the processor 305 executes the functionality required for provisioning enterprise services. In some cases, the processor 305 can include a data processing apparatus.

The server 302 also includes a memory 306 that holds data for the server 302. Although illustrated as a single memory 306 in FIG. 3, two or more memories may be used according to particular needs, desires, or particular implementations of the server 302. While memory 306 is illustrated as an integral component of the server 302, in alternative implementations, memory 306 can be external to the server 302.

The application 307 is an algorithmic software engine providing functionality according to particular needs, desires, or particular implementations of the server 302, particularly with respect to functionality required for provisioning enterprise service. Although illustrated as a single application 307, the application 307 may be implemented as multiple applications 307 on the server 302. In addition, although illustrated as integral to the server 302, in alternative implementations, the application 307 can be external to the server 302.

Further, the terms "client," "user," and other appropriate terminology may be used interchangeably, as appropriate, without departing from the scope of this disclosure. Moreover, this disclosure contemplates that many users may use one server 302, or that one user may use multiple servers 302.

FIG. 4 is a flow diagram showing an example process 400 for processing a resource request, according to an implementation. The process 400 can be implemented by the mobile device 102, the management server 150, the proxy host 140, the proxy server 120, the encryption server 130, and the application server 160 as shown in FIG. 1. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 400 begins at 410, where the application 210 and the management server 150 establish a secure communication channel. In some cases, the secure communication channel can be established according to a secure communication protocol, e.g., the Diffie-Hellman method. The application 210 and the management server 150 can establish a shared secret and derived keys that are used for communication between the application 210 and the management server 150.

At 420, the application 210 authenticates with the application server 160. In some cases, the authentication is performed while the application 210 is executing on the foreground of the mobile device 102. The authentication can be performed by verifying one or more login credentials. In one example, a user can enter a login name, a password, or a combination thereof using a user interface of the mobile device 102. The login credentials can be one or more alphanumerical symbols, one or more user interface gestures such as a swipe, a touch, a tap, a double-tap, a flick, a slide, a pinch, or any combinations thereof. The application 210 can receive the login credentials, verify the login credentials, and send an authentication token to the application server 160, an identity server associated with the application server 160, or a combination thereof for authentication. If the authentication is successful, the application 210 can receive services from the application server 160, including for example, transmitting resource requests while the application 210 is executing on the foreground of the mobile device 102.

At 430, the application 210 moves to background execution on the mobile device 102. The move to background execution can be determined by operating system of the mobile device 102, a user of the mobile device 102, or a combination thereof. In one example, a user may select to download a batch of files from the application server 160 and switches to another application to execute on the foreground of the mobile device 102 while the download is performed in the background. In another example, the operating system may switch the application 210 in background if the application 210 has been idle, e.g., without receiving user input, for a configured period. The application 210 may also be moved to the background by an interruption, e.g., by an inbound phone call. In some cases, step 430 may be performed before, after, or concurrently with the step 432. For example, the application 210 can move to background after the encryption credentials and the transmission path identifier are established.

At 432, the application 210 establishes one or more encryption credentials and a transmission path identifier with the management server 150. The one or more encryption credentials can include encryption keys that are used to encrypt resource requests generated by the application 210 and resource responses received by the application 210. In some cases, the same encryption key can be used to encrypt both the resource requests and the resource responses. Alternatively, one or more encryption credentials can include a first encryption key that is used to encrypt resource request generated by the application 210, and a second encryption key that is used to encrypt resource response received by the application 210. In some cases, asymmetric cryptography can be used, where a public key of the recipient is used to encrypt the resource requests or resource responses and the private key of the recipient is used to decrypt the resource requests or resource responses. Alternatively or in combination, a symmetric key can be used to encrypt and decrypt the resource requests or resource responses. In some cases, asymmetric cryptography can be used to protect the transmission of the symmetric key. For example, the public key of the recipient can be used to encrypt the symmetric key and the private key of the recipient can be used to decrypt the symmetric key. The communications between the application 210 and the management server 150 can be exchanged using the secure communication channel established at step 410 discussed previously.

In the illustrated example, the encryption server 130 handles the decryption of the resource requests and the encryption of the resource responses. Therefore, at 434, the management server 150 communicates with the encryption server 130 to provision the encryption credentials. In some cases, the steps 434 and 432 can be performed in a combined procedure, where the encryption server 130 and the application 210 exchange the encryption credentials through the management server 150. For example, a secure communication protocol, e.g., the Diffie-Hellman protocol, can be used to distribute the public and private keys of the encryption server 130 and the application 210. Alternatively or in combination, the management server 150 can set up the encryption credentials with the application 210 and send the encryption credentials to the encryption server 130. In some cases, the management server 150 and the encryption server 130 have established a secure communication channel to be used for the communications between the management server 150 and the encryption server 130, and the exchanges between the management server 150 and the encryption server 130 are encrypted. In some cases, the encryption credentials are specific to the application 210, where different applications executing on the mobile device 102 may use different encryption credentials.

The transmission path identifier indicates a transmission path for the forwarding of encrypted requests. In some implementations, the transmission path identifier can be a random number. Alternatively or in combination, the transmission path identifier can be encrypted address of the application server 160. The transmission path identifier can be used by the proxy server 120 to establish a mapping relationship between the encrypted requests received from the application 210 on the mobile device 102 and the encryption server 130. For example, the application 210 can include the transmission path identifier in the encrypted request that is sent to the proxy server 120. In some cases, the transmission path identifier can be included in the PATH field of the encrypted request. The proxy server 120 can detect that the received encrypted request including a particular transmission path identifier and forward the received encrypted request to particular encryption server, e.g., the encryption server 130, that has a mapping relationship with the particular transmission path identifier. Alternatively or in combination, the transmission path identifier can be used to establish a pairing relationship for a request-response exchange. For example, the proxy server 120 can receive an encrypted request from the application 210. The encrypted request can include a particular transmission path identifier. The proxy server 120 can receive an encrypted response from the encryption server 130. The encryption response has the same transmission path identifier. The proxy server 120 can pair the request and response based on the transmission path identifier, and forward the encrypted response to the application 210 as a response to the encrypted request. Additional details of these implementations will be discussed later.

In some cases, the transmission path identifier can be established during a provisioning process. In one example, at 440, the management server 150 sends a proxy request to the proxy host 140. The proxy request indicates a request to set up a proxy for the communication between the application 210 and the encryption server 130. At 442, the proxy host 140 provisions the proxy at the proxy server 120. At 444, the proxy host 140 sends a proxy response to the management server 150. The proxy response includes the address information of the proxy server 120. In some implementation, the management server 150 can generate the transmission path identifier and send to the proxy server 120, e.g., at 440 or at a different step. Alternatively or in combination, the encryption server 130 can generate the transmission path identifier and send to the management server 150. The management server 150 can send the address information and the transmission path identifier to the application 210. Other sequences of message exchanges between the management server 150, the proxy host 140, and the proxy server 120 can also be used to provision the proxy at the proxy server 120 and send the address of the proxy server 120 to the application 210.

In some cases, during the provisioning process, a mapping relationship between the application 210 and the encryption server 130 can be stored at the proxy server 120. In some cases, as discussed previously, the mapping relationship can be based on the transmission path identifier. During operation, the proxy server 120 can receive encrypted requests from the application 210, determine the corresponding encryption server 130 based on the mapping relationship, and send the encrypted requests to the encryption server 130. In some cases, the mapping relationship can be specific to the application 210, where different applications that are executed on the same mobile devices can be mapped to the different encryption servers by using different transmission path identifiers. Alternatively or additionally, the mapping relationship can be specific to the mobile device 102, where the different applications that are executed on the same mobile device can be mapped to the same encryption server 130 by using the same transmission path identifier. Alternatively or in combination, the proxy server 120 can be provisioned to use other information, e.g., an identifier of the application 210, the mobile device 102, or a combination thereof to establish a mapping relationship with an encryption server. In some cases, the management server 150 can update the provisioning by instructing the proxy server 120 to change the mapping relationship using an updated provisioning message.

Similar to the encryption credential establishment discussed previously, the transmission path identifier exchange part of the step 432 can be performed before, during, or after steps 440, 442, and 444. In one example, the management server 150 generates the encryption credentials and transmission path identifier, either alone or together with the application 210, and provisions the encryption server 130 and the proxy server 120 with the information. In this example, the transmission path identifier exchange part of the step 432 can be performed before steps 434 and 440-444. In another example, the management server 150 provisions the proxy server 120, and performs the steps 440-444 before sending the transmission path identifier to the application 210 to complete the step 432.

At 450, the application 210 generates a resource request and transmits the resource request to the system process 220.

In some cases, the resource request can be an HTTP GET, HTTP PUT, HTTP POST, or other HTTP message. The resource request is encrypted by the application 210 using the one or more encryption credentials, e.g., an encryption key, that were established at step 432. The final target address of the resource request, i.e., the address of the application server 160, is also encrypted and included in the encrypted resource request. The application 210 includes the transmission path identifier in the encrypted request, e.g., in the PATH field of an HTTP message. In some cases, the encrypted resource request can be formatted as an HTTP POST message.

In some cases, the application 210 can generate a resource request, and in response to the generation of the resource request, initiate the establishment of the encryption credentials and the transmission path identifier, e.g., step 432 as discussed previously. The application 210 can then use the established encryption credentials to encrypt the resource request and transmit the encrypted resource request to the system process 220.

At 452, the system process 220 transmits the encrypted resource request to the proxy server 120. At 454, the proxy server 120, based on the mapping relationship established in step 442, determines that the encrypted resource request should be forwarded to the encryption server 130. The proxy server 120 forwards the encrypted resource request to the encryption server 130. At 456, the encryption server 130, using the encryption credentials established at 434, decrypts the encrypted resource request. The encryption server 130 determines the final target address of the resource request based on the decrypted resource request, and transmits the decrypted resource request to the application server 160.

At 460, the application server 160 generates a resource response in response to the resource request. In some cases, the resource response can be Hyptertext Mark-up Language (HTML) files, Cascading Stylesheet (CSS) or JavaScript (JS) files that are references by an HTML file, image files that are referenced by an HTML or CSS file or other resource information requested by the application 210. The resource response can include files from an enterprise file repository, e.g., word processor files, presentation files, spreadsheets, database records of workflow or other enterprise data. In some cases, the resource response can be an OK reply to a posting of data. The application server 160 transmits the resource response to the encryption server 130. At 462, the encryption server 130, using the encryption credentials established at 434, encrypts the resource response and transmits the encrypted resource response to the proxy server 120. At 464, the proxy server 120 transmits the encrypted resource response to the system process 220. In some cases, the encrypted server 130 can include the address of the mobile device 102 as the target address for the encrypted resource response to inform the proxy server 120 to send the encrypted resource response to the mobile device 102.

At 466, the system process 220 forwards the encrypted response to the application 210. At 470, the application 210 uses the encryption credentials to decrypt the encrypted response and access the resource. In some cases, an authentication procedure similar to the one discussed previously with respect to step 420 is performed before the resources can be accessed. Alternatively or in combination, a different authentication procedure can be performed. In some example, the request encryption credentials are stored on the mobile device 102 in a protected file. The protection can be obtained by encryption using a key derived from a password set by the end user at the mobile device 102, e.g., an unlock password. When the encrypted response is received, the application 210 is resumed. The application 210 can prompt the user to enter the password. A key is derived from the entered password, and the request encryption credentials can be retrieved from the protected file using the derived key.

In some implementations, the management server 150 can act as a certification authority (CA) and signs electronic certificates that can be used for establishing a secure communication channel according to a Secure Sockets Layer (SSL) or a Transport Layer Security (TLS) protocol. During the step 432, the management server 150 can transmit a client certificate to the application 210. The management server 150 can also transmit a server certificate to encryption server 130 during the step 434. The proxy server 120 can verify the authenticate application 210, the encryption server 130, or both, before forwarding the encrypted request and response between them. In these cases, the encryption server 130 or the proxy server 120 can be implemented using virtual machine instances.

In some implementations, instead of using the proxy server 120 to push the encrypted request to the encryption server 130, e.g., as discussed in step 452 previously, a registration procedure can be used for the encryption server 130 to retrieve the encrypted request. In one example, the encryption server 130 can initiate a registration procedure by sending a registration request to the proxy server 120. The registration request can include the transmission path identifier. In some cases, the registration request can be an HTTP message. The proxy server 120 can receive the encrypted request, e.g., at step 450, determine the transmission path identifier included in the encrypted request, and send the encrypted request to the encryption server 130 as a response to the registration request, e.g., in a HTTP message. In some cases, more than one responses, e.g., multiple encrypted requests originated from the application 210, can be sent as responses to one registration request. In some cases, the encryption server 130 can be implemented behind a firewall of an enterprise and the proxy server 120 can be implemented outside of the firewall. This registration approach provides a mechanism for the encryption server 130 to initiate the through-firewall communication with the proxy server 120 by initiating outbound communication from behind the firewall to a network node outside of the firewall, and therefore provides better security of the firewall protection of the enterprise network.

FIG. 5 is a flow diagram showing an example method 500 for processing a resource request, according to an implementation. The method 500 can be implemented by the entities shown in FIG. 1, including e.g., the mobile device 102, the proxy server 120, the encryption server 130, and the application server 160. The method 500 shown in FIG. 5 can also be implemented using additional, fewer, or different entities. Furthermore, the method 500 shown in FIG. 5 can be implemented using additional, fewer, or different operations, which can be performed in the order shown or in a different order. In some instances, an operation or a group of operations can be iterated or repeated, for example, for a specified number of iterations or until a terminating condition is reached.

At 502, a mobile device transmits an encrypted request to a proxy server. The encrypted request comprises a Hypertext Transfer Protocol (HTTP) request. The HTTP request is addressed to an application server that provides service to an application on the mobile device. The encrypted request is encrypted using an application-specific credential that is associated with the application. In some cases, the encrypted request is transmitted by a system process operating on the mobile device, and the system process is configured to transmit HTTP requests for a plurality of applications on the mobile device. The system process is configured to transmit HTTP requests for the plurality of applications that are executed in background. In some cases, the application-specific credential is shared between the application and an encryption server.

At 504, the proxy server transmits the encrypted request to an encryption server. At 506, the encryption server decrypts the encrypted request to obtain the HTTP request. At 508, the encryption server transmits the HTTP request to the application server.

At 510, in response to receiving the resource request, the application server transmits a resource response to the encryption server. At 512, the encryption server encrypts the resource response and transmits the resource response to the proxy server. At 514, the mobile device receives the encrypted response from the proxy server. The encrypted response comprises an HTTP response generated by the application server Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
    receiving, at a mobile device, a transmission path identifier;
    transmitting, from the mobile device, an encrypted request to a proxy server, wherein the encrypted request comprises a Hypertext Transfer Protocol (HTTP) request, the HTTP request is addressed to an application server that provides service to an application on the mobile device, and the encrypted request is encrypted using an application-specific credential that is associated with the application, and wherein the encrypted request further comprises the transmission path identifier, and the transmission path identifier indicates a mapping relationship between the encrypted request and an encryption server that decrypts the encrypted request, and the encryption server is different than the proxy server; and
    receiving, at the mobile device and from the proxy server, an encrypted response in response to the encrypted request, wherein the proxy server receives the encrypted response from the encryption server, and the encrypted response comprises an HTTP response generated by the application server.

2. The method of claim 1, wherein the application-specific credential is shared between the application and the encryption server.

3. The method of claim 1, further comprising: decrypting the encrypted response.

4. The method of claim 1, wherein the proxy server transmits the encrypted request to the encryption server, the encryption server decrypts the encrypted request to obtain the HTTP request, the encryption server transmits the HTTP request to the application server, and the encrypted response is encrypted by the encryption server.

5. The method of claim 1, wherein the application is an email application.

6. The method of claim 1, wherein the encrypted request is transmitted by a system process operating on the mobile device, and the system process is configured to transmit HTTP requests for a plurality of applications on the mobile device.

7. The method of claim 6, wherein the system process is configured to transmit HTTP requests for the plurality of applications that are executed in background.

8. A mobile device, comprising:
at least one hardware processor; and
a non-transitory computer-readable storage medium coupled to the at least one hardware processor and storing programming instructions for execution by the at least one hardware processor, wherein the programming instructions, when executed, cause the at least one hardware processor to perform operations comprising:
receiving, at the mobile device, a transmission path identifier;
transmitting, from the mobile device, an encrypted request to a proxy server, wherein the encrypted request comprises a Hypertext Transfer Protocol (HTTP) request, the HTTP request is addressed to an application server that provides service to an application on the mobile device, and the encrypted request is encrypted using an application-specific credential that is associated with the application, and wherein the encrypted request further comprises the transmission path identifier, and the transmission path identifier indicates a mapping relationship between the encrypted request and an encryption server that decrypts the encrypted request, and the encryption server is different than the proxy server; and
receiving, at the mobile device and from the proxy server, an encrypted response in response to the encrypted request, wherein the proxy server receives the encrypted response from the encryption server, and the encrypted response comprises an HTTP response generated by the application server.

9. The mobile device of claim 8, wherein the application-specific credential is shared between the application and the encryption server.

10. The mobile device of claim 8, the operations further comprising: decrypting the encrypted response.

11. The mobile device of claim 8, wherein the proxy server transmits the encrypted request to the encryption server, the encryption server decrypts the encrypted request to obtain the HTTP request, the encryption server transmits the HTTP request to the application server, and the encrypted response is encrypted by the encryption server.

12. The mobile device of claim 8, wherein the application is an email application.

13. The mobile device of claim 8, wherein the encrypted request is transmitted by a system process operating on the mobile device, and the system process is configured to transmit HTTP requests for a plurality of applications on the mobile device.

14. The mobile device of claim 13, wherein the system process is configured to transmit HTTP requests for the plurality of applications that are executed in background.

15. A non-transitory computer-readable medium storing instructions which, when executed, cause a computing device to perform operations comprising:
receiving, at a mobile device, a transmission path identifier;
transmitting, from the mobile device, an encrypted request to a proxy server, wherein the encrypted request comprises a Hypertext Transfer Protocol (HTTP) request, the HTTP request is addressed to an application server that provides service to an application on the mobile device, and the encrypted request is encrypted using an application-specific credential that is associated with the application, and wherein the encrypted request further comprises the transmission path identifier, and the transmission path identifier indicates a mapping relationship between the encrypted request and an encryption server that decrypts the encrypted request, and the encryption server is different than the proxy server; and
receiving, at the mobile device and from the proxy server, an encrypted response in response to the encrypted request, wherein the proxy server receives the encrypted response from the encryption server, and the encrypted response comprises an HTTP response generated by the application server.

16. The non-transitory computer-readable medium of claim 15, wherein the application-specific credential is shared between the application and the encryption server.

17. The non-transitory computer-readable medium of claim 15, the operations further comprising: decrypting the encrypted response.

18. The non-transitory computer-readable medium of claim 15, wherein the proxy server transmits the encrypted request to the encryption server, the encryption server decrypts the encrypted request to obtain the HTTP request, the encryption server transmits the HTTP request to the application server, and the encrypted response is encrypted by the encryption server.

19. The non-transitory computer-readable medium of claim 15, wherein the encrypted request is transmitted by a system process operating on the mobile device, and the system process is configured to transmit HTTP requests for a plurality of applications on the mobile device.

20. The non-transitory computer-readable medium of claim 19, wherein the system process is configured to transmit HTTP requests for the plurality of applications that are executed in background.

* * * * *